Figure 1:
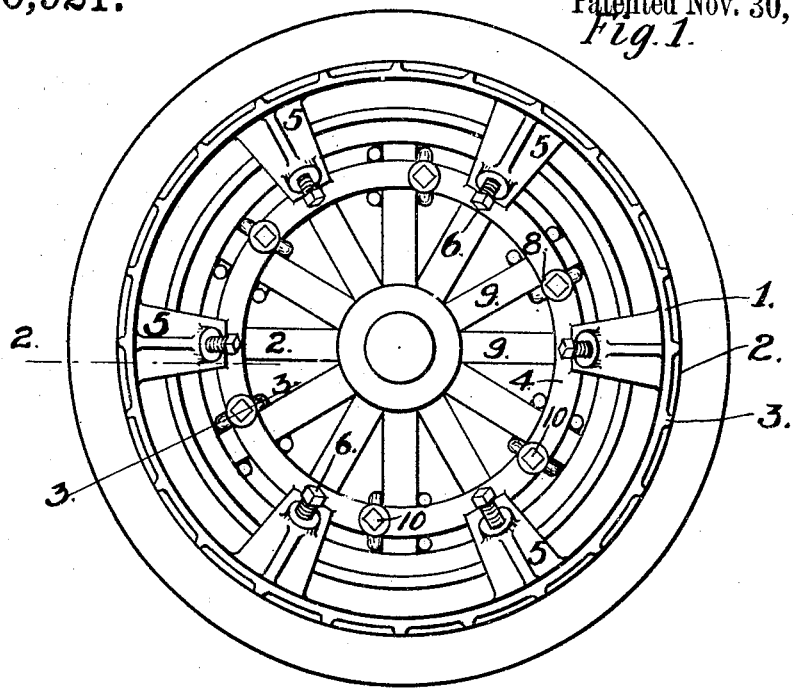

J. J. GIBNEY.
AUXILIARY WHEEL.
APPLICATION FILED DEC. 5, 1918.

1,360,921.

Patented Nov. 30, 1920.

Inventor
Joseph J. Gibney.
by C. D. Enochs
Attorney.

UNITED STATES PATENT OFFICE.

JOSEPH J. GIBNEY, OF MOTLEY, MINNESOTA.

AUXILIARY WHEEL.

1,360,921.  Specification of Letters Patent.  Patented Nov. 30, 1920.

Application filed December 5, 1918. Serial No. 265,804.

*To all whom it may concern:*

Be it known that I, JOSEPH J. GIBNEY, a citizen of the United States, and a resident of Motley, in the county of Morrison and State of Minnesota, have invented certain new and useful Improvements in Auxiliary Wheels, of which the following is a specification.

One object of my invention is to provide, in an auxiliary wheel, a rim for supporting the weight of a car thereon, and means for fastening the auxiliary wheel to the spokes of an automobile wheel.

Another object of my invention is to provide, in an auxiliary wheel for mounting on the spokes of an automobile wheel, a rim having mud cleats thereon, and a flange extending to the height of the mud cleats so that when running on a hard surface the cleats will not come into use.

Another object of my invention is to provide, in a device of the class described, means for accommodating the auxiliary wheel to various types of pneumatic tire rims, and also to wheels of different numbers of spokes.

With these and incidental objects in view, the invention consists of certain novel features of construction and combination of parts, the essential elements of which are hereinafter described with reference to the drawing which accompanies and forms a part of this specification.

Figure 2:
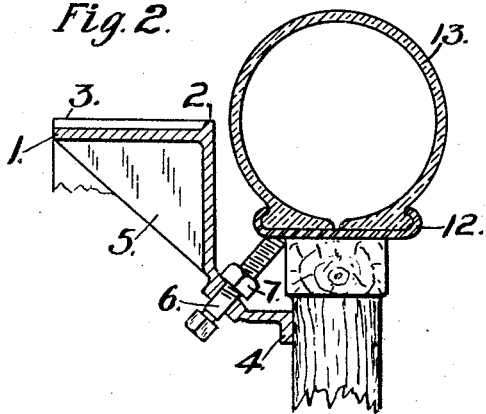

In the drawing Figure 1 is a side elevation of an automobile wheel having a pneumatic tire thereon and showing my auxiliary wheel applied thereto. Fig. 2 is a section taken on the line 2—2, Fig. 1, and Fig. 3 is a section taken on the line 3—3, Fig. 1.

Figure 3:
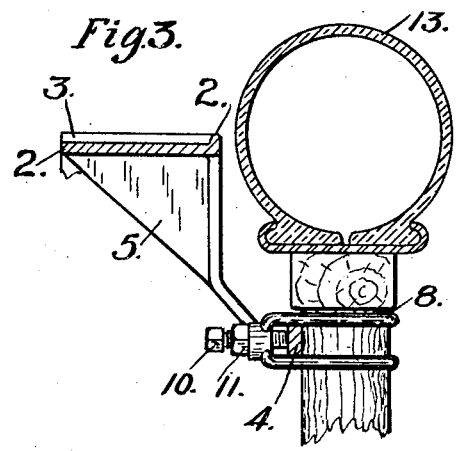

As shown in the drawing, the wheel consists of a rim 1, Figs. 1, 2 and 3, having a flange 2 extending outwardly about its perimeter and having cleats 3 spaced about the face of the rim to prevent slipping on the surface of the road.

A ring 4, concentric with the rim 3, is carried thereon, by T sectioned lugs 5, and each of these lugs has mounted therein a set screw 6 engaging therewith by screw connection and having lock nuts 7 thereon to positively lock it in position with the flange when properly adjusted.

Hook bolts 8 are provided for passing over the ring 4 and hooking around the spokes 9 of the wheel to which the rim is applied, and set screws 10 with lock nuts 11 are provided for tightly mounting the ring 4 to the spokes of the wheel through the hook bolts 8.

With the set screws 10 drawn up fairly snug the set screws 6 are tightened up so that they catch under the rim 12 to which the tire is applied, and the footing for this set screw is supplied equally well by either the clencher type of rim or the felly rim for a demountable rim.

The set screws 6 allow the centering of the rim 1 and when the rim is centered and a fair amount of pressure established outwardly against the rim 12, the set screws 10 are drawn snugly home, the lock nuts 11 and 7 drawn up, and the rim is ready for use.

With such a rim applied to the wheel of an automobile the resiliency of the pneumatic tire 13 is available under normal conditions, but if sand or mud is encountered and the wheels begin to spin so the tires embed themselves to the level of the rim 1, then the cleats and the extra surface of this rim 1 provides sufficient footing for lifting the car out of trouble and propelling it forwardly under any conceivable trouble of this nature.

Moreover, if a tire should be blown out or should become deflated to a considerable extent the flange 2 on the rim will carry the weight of the automobile and prevent the tire from being rim cut. Under such conditions, if the road is soft the cleats 3 will be effective and the car will ride along on the steel rims as a whole, but if such a blow out should occur on a hard pavement, then the flange 2 supports the weight and the cleats 3 are out of action and hence the wheel is not jolty as would be the case were not the flange provided.

While I have described my invention and illustrated it in one particular design, I do not wish it understood that I limit myself to this construction, as it is evident that the application of the invention may be varied in many ways within the scope of the following claims.

Claims:

1. In an auxiliary wheel the combination of a mounting ring, hook bolts for connecting said ring to the spokes of a wheel, lugs extending from said ring, a set screw carried by each of said lugs and adapted to impinge on the inner surface of a rim carried on the felly of the wheel to which the device is mounted, and a supporting rim carried by said lugs concentric with said mounting ring.

2. In an auxiliary wheel the combination of a mounting ring, lugs extending therefrom, a set screw carried by each of said lugs and adapted to impinge on the inner surface of a rim carried on the felly of the wheel to which the device is applied, a supporting rim carried by said lugs concentric with said ring, said supporting rim having a circumferentially extending flange around its perimeter, and earth engaging projections spaced about its face.

JOSEPH J. GIBNEY.